3,262,785
PROCESS FOR INHIBITING THE COLOR CHANGE DUE TO RIPENING IN BANANAS
William N. Anastos, Belmont, Mass., assignor to William G. Markos, Ipswich, Mass.
No Drawing. Filed Aug. 28, 1964, Ser. No. 392,952
4 Claims. (Cl. 99—168)

This application is a continuation-in-part of U.S. Serial No. 248,292, filed December 31, 1962, now abandoned.

This invention relates to bananas and more particularly to a novel process for substantially improving the appearance of bananas.

Heretofore, the extremely short period of time during which bananas retain their optimum appearance after they have attained a salable stage in the ripening process had been a constant problem in the banana industry. Thus, the period of time during which bananas which were ripe enough for sale to the public had a "salable appearance" has in the past been limited to two or three days. Such a short period of time had placed bananas high on the list of most perishable goods and it was generally universally accepted that bad weather, minor transportation difficulties, or the like could seriously adversely affect the economic status thereof. In accordance with the present invention, however, said period of time has been increased substantially. Moreover, the process of the present invention is extremely simple and straightforward and adds very little to the cost of the bananas.

Accordingly, it is a principal object of the present invention to provide a process for substantially extending the period of optimum appearance of bananas while in storage, on the store shelf, at home, or the like.

It is another object of the present invention to provide a process for extending the period of salability of bananas, which process is extremely simple, straightforward and economically attractive.

Other objects of the present invention will in part be obvious and will in part appear hereinafter.

In accordance with the present invention, it was discovered that when bananas are coated with polyvinyl acetate, the period of optimum appearance of the bananas, i.e., the period after the banana is sufficiently ripe during which some green color is retained in the skin thereof, is significantly increased. This discovery was most unexpected in view of the fact that it had been previously and widely reported that coating bananas with any material which might inhibit the intake of oxygen, or exhaust of carbon dioxide, would damage the bananas seriously. In accordance with the present invention, however, it was discovered that not only are the bananas not damaged by the coating of polyvinyl acetate but that the period of optimum appearance in storage or in the store, or at home is normally substantially increased. In addition, it was discovered that treated bananas exhibit a most desirable sheen which adds significantly to the attractiveness, and therefore, the salability thereof.

The present invention is not limited to the treatment of any particular type of banana. Accordingly, all bananas such as bananas from Ecuador, Honduras, Peru, Trinidad or etc. are suitable for treatment in accordance with the present invention. It has been found, however, that Cavendish and Cavendish-Gros Michel bananas are very favorably affected by treatment in accordance with the present invention.

The thickness of the polyvinyl acetate coating applied was found to be critical in that when the film is too thin, improvement or a substantial improvement in the appearance of bananas does not occur. On the other hand, when the film is too thick, the banana bears an unnatural look and the pulp of the banana often becomes soft and mushy in which condition the bananas are not readily acceptable to the consumer. Thus, it was discovered that in order to get the most desirable results, the bananas should be dipped, sprayed or the like with an aqueous emulsion of polyvinyl acetate comprising between above about 11% and below about 40% by weight solids. While some variation on the concentration of said emulsions can be tolerated, for best and consistent results, it is suggested that the concentrations of said emulsions be maintained within these approximate limits.

The manner of applying the coating to the bananas is not critical. The coating can be applied in any convenient manner such as by spraying a polyvinyl acetate emulsion on the bananas. In the preferred embodiments, however, the polyvinyl acetate coating is applied to the bananas by dipping the bananas into a polyvinyl acetate emulsion one or more times until a coating of sufficient thickness has been deposited thereon. Thus, aqueous emulsions of polyvinyl acetate comprising less than about 11% solids by weight can be used when the bananas are, for example, dipped thereinto a sufficient number of times to deposit thereon a coating having a thickness that would normally be obtained by dipping the bananas once into an aqueous emulsion comprising between above about 11% and below about 40% solids.

The thickness of the coating can obviously be varied in a number of ways. It has been found, however, that the most convenient manner of controlling the thickness of the coating is by dipping the bananas, for example, in hands or bunches, in an aqueous emulsion of polyvinyl acetate wherein the concentration of polyvinyl acetate solids is carefully controlled between above about 11% and below about 40% solids. Suitable concentrations can be readily determined in practice but in general, aqueous emulsions comprising between about 15% and about 35% by weight of the total solution of polyvinyl acetate are very much preferred.

As stated above, the manner of application of the coating to the bananas is not critical. Any of the well-known casting, spraying or dipping procedures or the like can be used. However, dipping hands of bananas in an emulsion of polyvinyl acetate contained, for example, in a vat is so straightforward and involves so small an initial capital expenditure, that it is greatly preferred.

There follow a number of non-limiting illustrative examples:

*Example 1*

An aqueous polyvinyl acetate emulsion of the desired concentration is prepared by mixing at a temperature of about 25° C. about 1000 cc. of an aqueous polyvinyl acetate emulsion comprising about 55% by weight polyvinyl acetate solids and 1000 cc. of water. A hand of Ecuador bananas ripened to stage 4 (the stage at which bananas are normally delivered to the store) was then split into two parts, hereafter referred to as parts A and B. Part A was dipped momentarily into said prepared polyvinyl acetate emulsion and then removed from said emulsion and allowed to drip dry. Parts A and B were then placed adjacent each other under store shelf conditions, i.e., at temperatures between about 25° C. and about 30° C. After three days, part B, the untreated half of the hand retained none of the original green coloring on the skin thereof and accordingly part B was not in a readily salable condition. Part A, which had been treated in accordance with the present invention, however, retained substantial green coloring and therefore was readily salable even after five days.

*Example 2*

An aqueous emulsion of polyvinyl acetate having a solid content of about 11% was prepared by mixing at a temperature of about 25° C. about 1400 cc. of an aqueous polyvinyl acetate emulsion comprising 55% by weight polyvinyl acetate solids and about 5600 cc. of water. A hand of stage 4 Ecuador bananas was then split into two parts, hereafter referred to as parts A and B. Part A was dipped into said prepared polyvinyl acetate emulsion momentarily and then removed therefrom and allowed to drip dry. Parts A and B were then placed adjacent each other on a shelf which was maintained at a temperature of between about 25° C. and about 30° C. After three days on said shelf, part B, the untreated half of the hand, retained no green coloring. Part A, however, was substantially in the same condition. Thus, it is clear that dipping the bananas in an aqueous polyvinyl acetate emulsion comprising less than about 11% by weight solids does not substantially improve the shelf life of the bananas.

*Example 3*

An aqueous emulsion of polyvinyl acetate having a solids content of about 40% by weight solids was prepared by mixing at about 25° C., 1000 cc. of an aqueous polyvinyl acetate emulsion comprising 55% solids by weight and 350 cc. of water. A hand of stage 4 Ecuador bananas was then split into two parts, hereinafter referred to as parts A and B. Part A was dipped into said prepared emulsion and then allowed to drip dry. Parts A and B were then placed adjacent each other on a shelf which was maintained at a temperature of between about 25° C. and about 30° C. After four days on said shelf, part B retained no green coloring. Part A, however, in addition to having a totally unnatural bright sheen, was in a soft mushy condition particularly on the bruised portions of the banana. Thus, it is clear, that dipping bananas in an aqueous polyvinyl acetate emulsion comprising more than 40% by weight solids does not substantially improve the period of salability of the bananas.

Obviously, many changes can be made in the above specification and examples without departing from the scope of the present invention. For example, while only aqueous emulsions were specifically mentioned above, clearly other emulsions such as emulsions in organic media are suitable and may be utilized, although aqueous emulsions are obviously definitely preferred. Accordingly, it is intended and therefore it should be understood that the above specification and examples are illustrative in nature and in no way limit the scope of the present invention.

What I claim is:

1. A process for inhibiting the normal color change which occurs in the skin of bananas during the ripening cycle which comprises enveloping the bananas with a coating consisting essentially of polyvinyl acetate, said coating having a thickness equivalent to that obtained by dipping the untreated bananas once in an emulsion consisting essentially of water as the continuous phase and above about 11% and below about 40% by weight polyvinyl acetate solids as the dispersed phase.

2. The process of claim 1 wherein the coating enveloping the bananas has a thickness equivalent to that obtained by dipping the untreated bananas once in an emulsion consisting essentially of water as the continuous phase and between about 15% and about 35% by weight polyvinyl acetate solids as the dispersed phase.

3. The process of claim 1 wherein the coating is applied by dipping the bananas in an emulsion consisting essentially of water as the continuous phase and polyvinyl acetate solids as the dispersed phase.

4. The process of claim 2 wherein the coating is applied by dipping the bananas in an emulsion consisting essentially of water as the continuous phase and polyvinyl acetate solids as the dispersed phase.

References Cited by the Examiner

UNITED STATES PATENTS

| | | | |
|---|---|---|---|
| 2,961,322 | 11/1960 | Winterberg | 99—166 |
| 2,975,067 | 5/1961 | Winterberg | 99—166 |
| 3,090,689 | 5/1963 | Tillet | 99—166 |

FOREIGN PATENTS

| | | |
|---|---|---|
| 761,856 | 11/1956 | Great Britain. |
| 854,067 | 11/1960 | Great Britain. |

A. LOUIS MONACELL, *Primary Examiner.*

L. M. SHAPIRO, *Assistant Examiner.*